March 17, 1931. L. MATHIEU 1,796,571
MEANS FOR MAKING SPUN GLASS
Filed Sept. 4, 1929 2 Sheets-Sheet 1
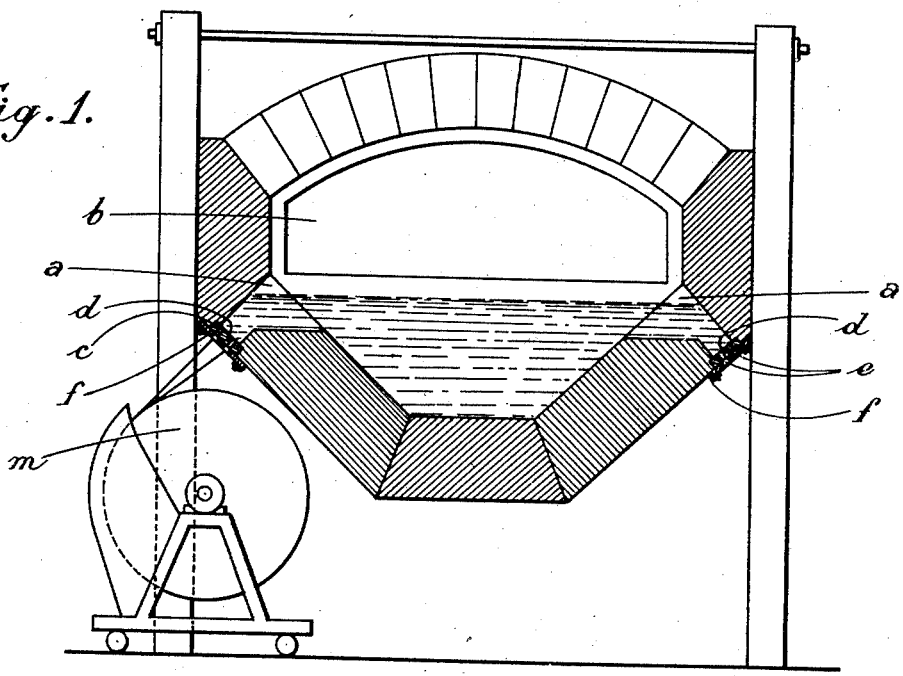
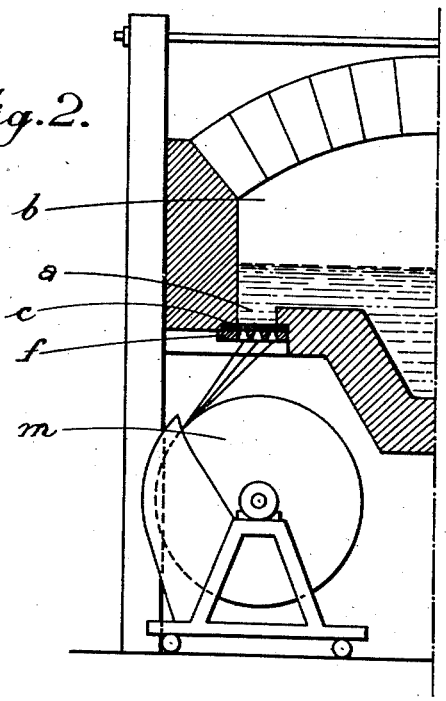
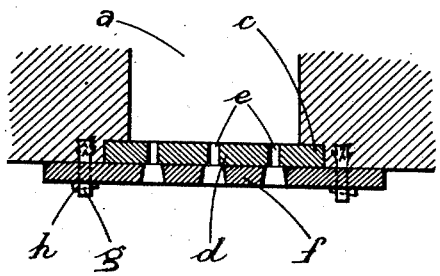
L. Mathieu
INVENTOR
By Marks & Clerk
Attys.

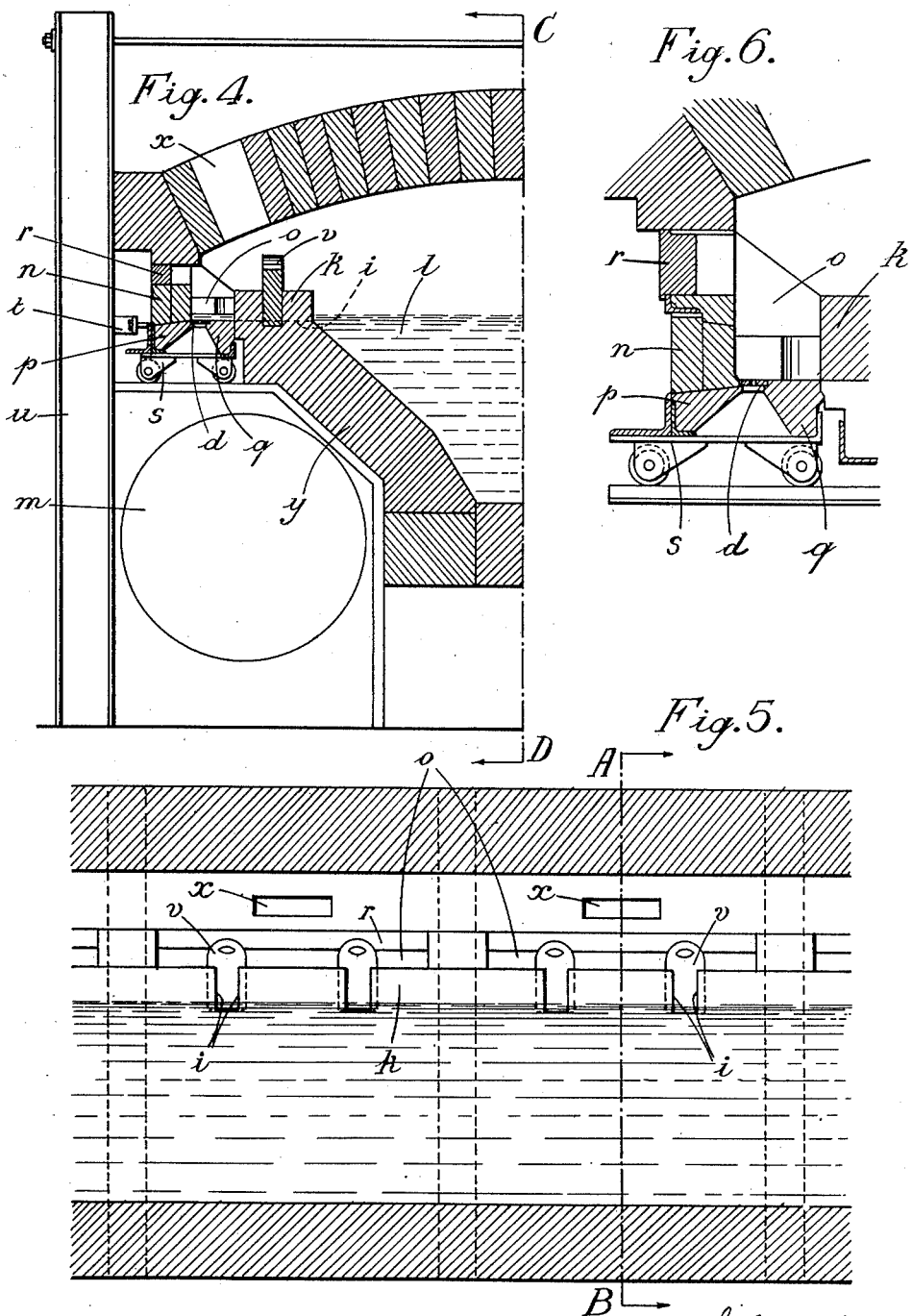

Patented Mar. 17, 1931

1,796,571

UNITED STATES PATENT OFFICE

LOUIS MATHIEU, OF PARIS, FRANCE

MEANS FOR MAKING SPUN GLASS

Application filed September 4, 1929, Serial No. 390,402, and in France September 12, 1928.

The present invention has reference to the manufacture of spun glass and it has for its object to provide means permitting of directly drawing glass threads from a tank furnace and thus of utilizing a very large supply of molten glass whereby the operation can be carried out both in a more rational manner and on much larger scale than with the processes used heretofore.

In order to make spun glass special furnaces or receptacles of small size had to be resorted to, which had a perforated bottom so as to allow of the molten glass passing therethrough. It is however out of question to perforate for this purpose the bottom of a tank furnace on account of practical difficulties of construction, of access and of upkeep inherent to the presence therein of a large mass of molten glass.

According to this invention I avoid these inconveniences by providing in the side walls of the tank furnace ports into which are fitted removable plates pierced with holes forming passages for the glass and held externally by a suitable support. The plates are made of refractory material or of alloys adapted to withstand high temperatures. The supporting members may comprise metal counterplates, frames or grids. In the preferred embodiment of my invention the ports in the side walls open into compartments separated from the tank by partitions projecting inwardly from the side walls, and means are provided for connecting said compartments with the tank through said partitions.

In addition to the possibility of carrying out the spinning of glass on a large scale and under very economical conditions, the arrangement according to this invention has many advantages of a practical nature. The refractory plates can easily be made to the most favourable size and they can easily be replaced wholly or in part without damaging the furnace structure. They can be arranged, according to requirements, in a horizontal, inclined, or vertical position, while remaining easy of access and leaving the space under the furnace free for the installation of heat regenerators. I am also enabled to choose for locating these plates the height at which the molten glass will have the degree of fluidity most suitable for drawing purposes, and their position above the bottom of the tank makes it possible to interrupt the drawing operation by merely causing the level of the glass to sink or by cutting off the supply of glass from the tank. The use of these plates, on the other hand, is suitable for most processes of making spun glass heretofore in use, and in particular for the process consisting of separating from the mass of molten glass drops carrying each with it a thread which is wound on a revolving drum or cylinder.

In order that the nature of the invention may be more fully understood, reference will be had to accompanying drawing in which two embodiments of my invention are illustrated by way of example.

Fig. 1 is a sectional view of a tank furnace fitted for the production of spun glass.

Fig. 2 is a similar view to Fig. 1 showing in section half of a modified structure.

Fig. 3 is on a larger scale a section of a plate with its counter plate, illustrating a manner of securing same in a port of the furnace.

Figs. 4 to 6 illustrate the preferred embodiment of my invention, Fig. 4 being a sectional view on line A—B of Fig. 5 showing one half of a furnace, the other half (not shown) being symmetrical with respect to line C—D.

Fig. 5 is a fragmental section on line C—D of Fig. 4 and

Fig. 6 is an enlarged sectional view of the spinning means shown in Fig. 4.

In Figs. 1, 2 and 3 it is seen that ports $a$ are provided in the side walls of the furnace $b$. They are provided with grooves $c$ to receive plates $d$ of refractory earth pierced with holes $e$ and these plates are held by metal counterplates $f$ which are provided with holes of larger size and secured by cotters $g$ and pins $h$. In Fig. 1 the refractory plates $d$ are arranged obliquely and in Fig. 2 horizontally, and in each case the walls of the furnace are suitably shaped to accommodate the ports or openings $a$. The refractory plates $d$ and the counterplates $f$ are not necessarily made of a single piece occupying the entire width of a port, but they may be made of a plurality of sections side by side, thus facilitating the replacement thereof in case of damage or wear.

At $m$ is shown a drum on which the glass threads are wound in accordance with a known process.

In the embodiment shown in Figs. 4 to 6, a partition $k$ separates from the tank $l$ a series of compartments $o$ closed outwardly by refractory blocks $n$, $p$, $q$ and a filling of brickwork $r$ all of which are removable and shut the gap in the side wall $y$ between the partition $k$ and the roof. Between the blocks $p$ and $q$ at the bottom of each compartment $o$ are one or more slits or ports in which are removably fitted the perforated plates $d$ for drawing the glass.

The blocks $n$, $p$, $q$ are mounted on metal suports $s$ preferably in the form of carriages adapted to fit exactly against the partition $k$. These carriages may be held in position by clamping means $t$ bearing against the ports $u$ of the outer structure and the gap between the blocks $n$ and the roof is closed by a suitable filling $r$ of brickwork or the like.

Through the partition $k$ extend passages $i$ adapted to be closed by slides $v$ which may be lifted in order to open a connection from the tank $l$ to the compartments $o$, before the brickwork $r$ is put into place.

Openings $x$ are provided in the roof for the heating gases which are admitted on one side of the furnace and evacuated on the other side after having crossed the entire width thereof. It will be understood, however, that the arrangement of these openings and other constructional details shown may be varied without departing from the scope of the appended claims.

I claim:

1. In a glass furnace of the tank type, the combination of a side wall having a port therein, means for closing said port comprising a removable perforated plate of heat resisting material, means engaging said side wall for supporting said plate and holding same in position, and means for drawing glass from said furnace through said perforated plate.

2. In a glass furnace of the tank type, the combination of a side wall having a series of horizontal ports therein, means for closing said ports comprising removable perforated plates of heat resisting material, metal supports engaging said side wall for supporting said plates and holding same in position, and means on the side of said furnace for drawing glass therefrom through said perforated plates.

3. In a glass furnace of the tank type, the combination of a side wall having a removable portion with a port therein, a perforated plate of heat resisting material removably fitted in said port, a removable support for said wall portion, means for securing said support in position, and means for drawing glass from said furnace through said perforated plate.

4. In a glass furnace, the combination of a glass tank having a side wall with a removable upper portion, a partition projecting inwardly from said side wall for separating the glass in said tank from said removable portion, passages for the glass extending through said partition, means for controlling said passages, perforated plates of heat resisting material fitted in said removable wall portion, and means for drawing glass from said furnace through said perforated plates.

5. In a glass furnace, the combination of a glass tank having a side wall with a removable upper portion, said wall portion comprising refractory blocks separated by a gap, a perforated plate of heat resisting material removably fitted in said gap and a brickwork filling, a metal carriage supporting said wall portion, means for holding said carriage in position, a partition projecting inwardly from said side wall for separating the glass in said tank from said perforated plate, a passage for the glass extending through said partition, means for controlling said passage, and means for drawing glass from said furnace through said perforated plate.

In testimony whereof I affix my signature.

LOUIS MATHIEU.